United States Patent Office 3,239,943
Patented Mar. 15, 1966

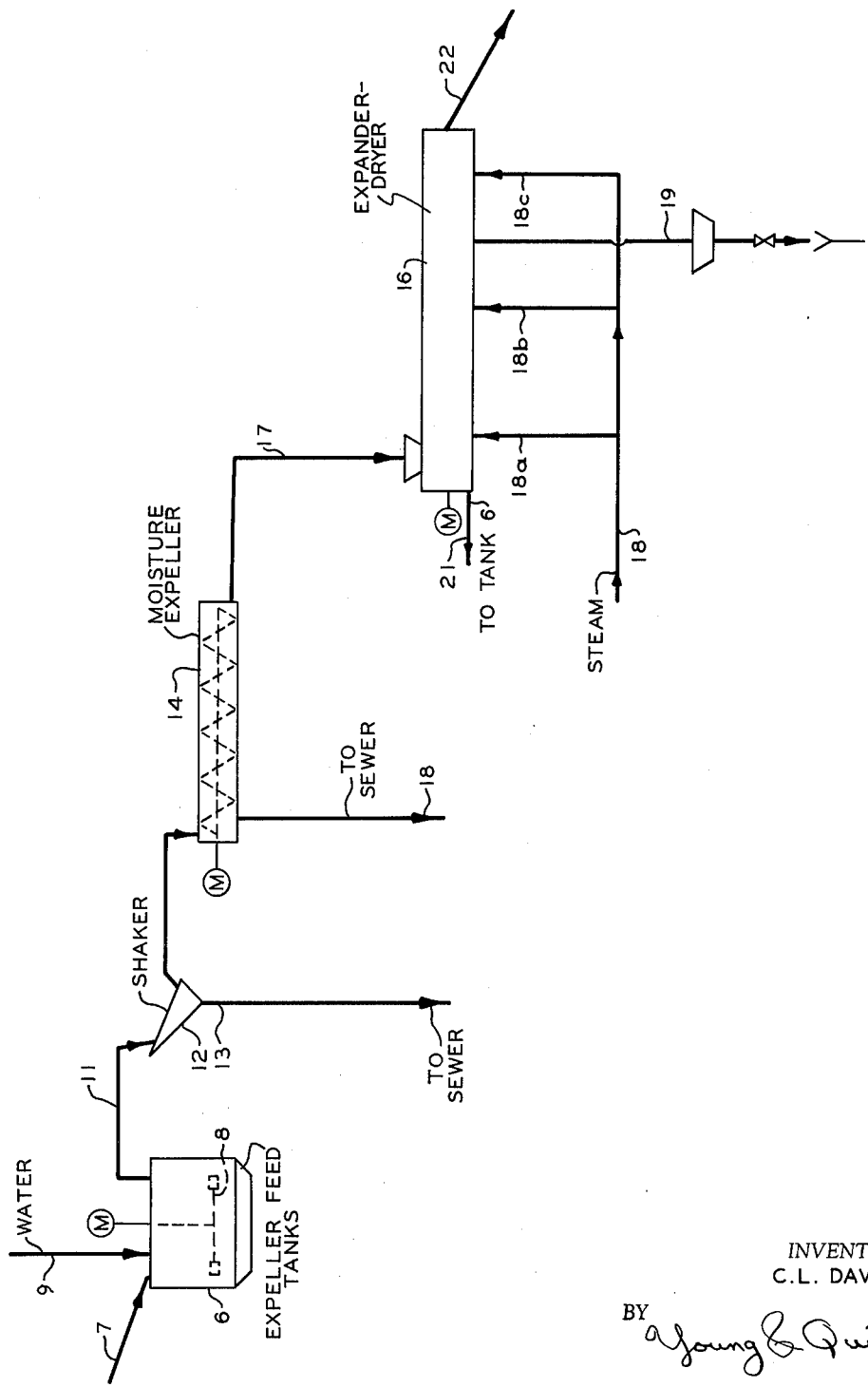

3,239,943
COOLING RUBBER CRUMB FOR DRYER FEED
Charles L. Davis, Borger, Tex., assignor to Phillips Petroleum Company, a corporation of Delaware
Filed Dec. 21, 1961, Ser. No. 161,150
2 Claims. (Cl. 34—13)

This invention relates to a process for the expelling of moisture from a rubbery homopolymer while in crumb form. In another aspect it relates to demoisturizing rubber crumb using demoisturizing equipment in a manner free of plugging and other operational difficulty.

Many types of rubber are dried in the form of a crumb or sheet. The earliest of these was natural rubber which is obtained in crumb form following coagulation of the latex. Quite similar is the rubber crumb obtained in the familiar emulsion polymerization process to produce rubbery copolymers of butadiene and styrene. Butyl rubber, a copolymer of a minor amount of a conjugated diene, usually isoprene, and a major amount of a monoolefin, usually isobutylene, is frequently recovered in crumb form from a solution of the rubber in a solvent. Newer forms of synthetic rubbers have been developed and among these are the conjugated diene polymers produced in solution using organomental initiators. A convenient method of recovery of the rubber from solution is to use a steam stripping process. This produces wet rubber crumb.

In the prior art of demoisturizing SBR rubber crumb, for example, with a demoisturizing apparatus, it was standard practice to operate the apparatus at as high a temperature as practicable, preferably around the boiling point of water. This was accomplished by adding very hot water to the slurry feed tank, in order to raise the temperature of a slurrry of crumb rubber to near the vaporization point of the occluded water. Thus, the amount of mechanical work required to be expended on the crumb and to increase the temperature in the subsequent drying steps was greatly reduced.

The long experience of rubber crumb drying, gained with SBR, was applied to the drying of the new diene homopolymers, which are 1,4-addition polymers of butadiene and isoprene. Among these are: cis-1,4-polybutadiene, trans-1,4-polybutadiene, cis-1,4-polyisoprene, and trans-1,4-polyisoprene.

Upon start-up of a commercial plant for the production of cis-1,4-polybutadiene employing the time-tested method of operation, heated rubber crumb was fed first to a moisture expeller unit. In a subsequent expander-dryer unit, chronic plugging difficulties occurred. This repeatedly shut down the entire drying train, while the expander-dryer unit was being cleaned out and returned to service. This condition is simply intolerable in a continuous, large tonnage, rubber crumb drying process.

I have discovered that feeding a cooled rubber crumb to the moisture expeller overcomes the plugging and shutdown problem in the expander-dryer, and permits smooth operation of drying train. This result is quite unexpected, being contrary to the general experience in the rubbery polymer drying art, which has practiced maintaining the temperature of the rubber crumb in the range 125°–175° F. Moreover, the closer the temperature of the crumb to the boiling point of water in the drying system, the more satisfactory was its operation.

This improvement is accomplished, according to my invention, by introducing cool water into a crumb slurry surge zone in a quantity sufficient to cool the crumb slurry down to between 65 and 105° F., dewatering the dilute slurry, and passing the resulting wet rubber crumb to a moisture expelling apparatus which more effectively demoisturizes the crumb. Because of the lower temperature and lower moisture content of the homopolymer crumb, I have realized smooth operation of the expander-dryer, eliminating the serious plugging difficulty initially experienced in the latter.

It is an object of this invention to provide an improved method of drying a rubbery homopolymer crumb.

It is another object to inhibit plugging of the moisture expeller in the drying train of rubbery homopolymer polymerization process.

Still another object is to cool the rubber crumb in a homopolymer producing process to permit smooth operation of the moisture expeller.

Various other objects and advantages of the invention willl be apparent from a study of the disclosure, the drawing, and the appended claims.

Referring now to the drawing which illustrates, in schematic form, the process of my invention. A conventional rubber crumb feed tank 6 is shown. A relatively hot (about 200° F.) wet rubbery homopolymer crumb continuously enters tank 6 via conduit 7. Tank 6 is continuously agitated by a motorized paddle 8 to maintain the crumb in slurry form.

A conduit 9 is provided which introduces raw water into tank 6 at a temperature between 65° and 105° F,. and preferably between 75° and 85° F., if conveniently available. The resulting diluted and cooled slurry overflows this tank, and passes via conduit 11 over a shaker screen 12, thus removing free water. The separated water passes to disposal via conduit 13. Thereafter, the dewatered rubber crumb passes into a moisture expeller 14, such as a V. D. Anderson Company No. 5 moisture Expeller, which is a continuous mechanical screw press. The structure and method operation of this type of expeller is detailed in an article in Chemical Engineering Progress (vol. 57, No. 5) p. 53, May 1961. There is only a negligible crumb temperature increase experienced due to the work done in the expeller.

The occluded water is largely removed, and the partially demoisturized crumb passes on to an Anderson Company Expander-Dryer 16 via conduit 17. The structure of this steam-jacketed, extrusion-dryer is shown in an article in Chemical Engineering (vol. 68, No. 23), p. 9, November 13, 1961. Steam enters the dryer jacket via valve conduit 18, 18a, 18b, and 18c. The steam condensate is disposed of via conduit 19. In expander 16, moisture is pressed from the crumb and passes from dryer 16 via conduit 21 back to tank 6. The crumb temperature is increased further by the mechanical work done therein to permit flash vaporization of substantially all of the remaining moisture after the rubber is extruded from expander 16 to cooling and baling via conduit 22.

The rate of cold water injection via conduit 9 can be readily manipulated, knowing the slurry feed rate and temperature, to give a desire temperature for the dewatered crumb entering the moisture expeller.

The 1,4-addition polymers of butadiene and isoprene are prepared by a number of well-known processes. A process applicable to the polymerization of such monomeric materials containing from 4 to 8 or more carbon atoms is disclosed in U.S. Patent #2,846,427, issued August 5, 1958 to R. A. Findlay. This patent discloses catalyst systems suited to give stereoregular polymers butadiene and isoprene, both cis and trans configuration.

The following example illustrates operation of the expeller feed tank according to my invention.

*Example I*

A butadiene polymer of approximately 95 percent cis 1,4-addition was prepared by polymerizing butadiene in a toluene solvent in the presence of an initiator comprising a mixture of triisobutylaluminum, titanium tetrachloride, and titanium tetraiodide. Following polymerization the catalyst was inactivated and an antioxidant added. By steam stripping, a rubber crumb was formed. This rubber had a Mooney viscosity (ML-4 at 212° F.) of 43.5. The rubber crumb leaves the stripping zone as a water slurry, the slurry contained about 5.7% by weight of crumb rubber. The slurry flow rate, based on 3030#/hour of dry rubber crumb, was about 6000 gallons/hour, and had a temperature of about 200° F. The slurry was passed over a dewatering screen, and transferred to expeller feed tank 6 as a wet rubber crumb.

Raw water was introduced into tank 6 via conduit 9 at a rate of averaging 104 gallons per minute, and a temperature of about 80° F. The slurry cooled down to about 90° F., overflowed tank 6, and was passed via conduit 11 over a shaker screen 12. The resulting wet rubber crumb, having about 50% water, remained at about 90° F. as it entered moisture expeller 14.

Demoisturized rubber crumb still containing about 5% moisture was discharged from the expeller at a rate of 3030#/hr., based on dry rubber. The crumb was fed to the expander-dryer, which operated smoothly without plugging, to produce substantially dry rubber. The extruded rubber was passed to conventional cooling and baling equipment.

Various modifications and alterations of this invention will become apparent to those skilled in the art without departing from the scope and spirit of this invention and it should be understood that the latter is not necessarily limited to the aforementioned discussion.

I claim:
1. In a process which comprises introducing a rubbery diene polymer crumb into a demoisturizing zone comprising a continuous screw press and downstream therefrom an extrusion dryer; the improvement which comprises introducing a hot water slurry of said rubbery diene polymer crumb into a mixing zone upstream of said demoisturizing zone, introducing cool water into said mixing zone and therein contacting said slurry with said cool water in said mixing zone so as to sufficiently further dilute and cool said slurry to a temperature in the range between 65 and 105° F. in a predemoisturizing zone cooling step, and thereafter removing the free water from the resulting cooled crumb prior to the introduction of said cooled crumb to said demoisturizing zone.

2. The process of claim 1 wherein said rubbery diene polymer is selected from the group consisting of cis-1,4-polybutadiene, trans-1,4-polybutadiene, cis-1,4-polyisoprene, and trans-1,4-polyisoprene.

References Cited by the Examiner
UNITED STATES PATENTS

| | | | |
|---|---|---|---|
| 2,371,722 | 3/1945 | Wanderer | 34—14 |
| 2,665,568 | 1/1954 | Meyer | 34—13 |
| 2,930,784 | 3/1960 | Hanson | 260—94.9 |
| 2,953,556 | 9/1960 | Wolfe | 260—94.9 |
| 2,957,855 | 10/1960 | McLeod | 260—94.7 |
| 3,067,462 | 11/1962 | Kullgren | 34—92 X |

WILLIAM F. O'DEA, *Primary Examiner.*
CHARLES O'CONNELL, NORMAN YUDKOFF, PERCY L. PATRICK, *Examiners.*